July 13, 1965 D. G. AINLEY ETAL 3,194,744
CLOSED CYCLE GAS TURBINE SYSTEM
Filed March 5, 1962 3 Sheets-Sheet 2

David G. Ainley
Martin Cox
John A. Flint
Inventors
By
Stevens, Davis, Miller & Mosher
Attorneys July 13, 1965  D. G. AINLEY ETAL  3,194,744
CLOSED CYCLE GAS TURBINE SYSTEM
Filed March 5, 1962  3 Sheets-Sheet 3

David G. Ainley
Martin Cox
John A. Flint
Inventors

By
Stevens, Davis, Miller & Mosher
Attorneys

United States Patent Office 3,194,744
Patented July 13, 1965

3,194,744
CLOSED CYCLE GAS TURBINE SYSTEM
David Geoffrey Ainley, Farnborough, Martin Cox, Fleet, and John Avery Flint, Farnborough, England, assignors to Power Jets (Research and Development) Limited, London, England, a British company
Filed Mar. 5, 1962, Ser. No. 177,350
Claims priority, application Great Britain, Mar. 13, 1961, 9,039/61
4 Claims. (Cl. 176—60)

The present invention is concerned with a gas turbine-compressor circulator set for use in a closed-cycle system, that is, a system wherein working fluid is circulated in a closed circuit, the compressor supplying working fluid to a heat source, where it is heated, and thence to a turbine, and the turbine discharging the working fluid to a heat sink, where it is cooled, and from which it is returned to the compressor.

The invention has particular application to a gas turbine-compressor circulator set for use in the cooling system of a nuclear reactor. It has already been proposed that the fan driven from an external source as now used for circulating gases in such a cooling system should be replaced by a self-driving gas turbine-compressor circulator set, the compressor and turbine being arranged in a closed circuit as aforesaid. The reactor is then the heat source while the heat sink is a heat exchanger in which the circulating gas gives up heat to generate steam which is used to drive a turbine for the generation of electricity. In such an application a number of special requirements arise. Thus on the one hand a high level of gas pressure is necessary in the cooling system to obtain high rates of heat transfer in the reactor and the heat exchanger. There must on the other hand be a negligible rate of gas leakage from the system as a whole, though internal leakages between, say, the compressor outlet and the turbine inlet are of lesser consequence. Accordingly it is desirable to enclose the set in a leak-tight pressure casing. It is also desirable to make provision for removing the set (which may become radio-active) as a unit and replacing it by a spare set. The present invention relates to certain features of the construction, mounting and arrangement of such a circular set having regard to the above-mentioned requirements.

The invention accordingly provides a gas turbine-compressor circulator set assembly for a closed cycle system comprising an outer pressure casing which is closable at one end and is connected at its other end to an inlet duct for receiving gas from the heat sink of the system, an outlet duct extending through the side of the casing for conducting gas to the heat source, and a circulator comprising a coaxial compressor and turbine having a driving connection between them and mounted coaxially within the casing with the compressor inlet at the closable end and the turbine outlet directed towards the other end, the compressor being arranged to receive gas from the inlet duct through an annular passage within the casing and surrounding the circulator and to discharge into said outlet duct and the turbine being connected to receive gas from the heat source through a duct mounted coaxially within the outlet duct and to supply gas to the heat sink through a duct mounted coaxially within the inlet duct.

According to a feature of the invention the circulator is supported from the pressure casing in such a manner as to permit bodily removal through the closable end thereof. The pressure casing may accordingly be of circumferentially one piece construction to enable it better to withstand the pressure loads and to minimise leakage. According to a further feature of the invention the support of the circulator from the casing is such as to permit free thermal expansion both radially and axially. Thus the set is supported at its compressor end by a mounting permitting differential radial expansion and at the turbine end by a mounting permitting differential radial and axial expansion. In a particular form of the invention, the compressor end mounting includes radial members secured at their outer ends to the casing and at their inner ends to a radial face on the compressor stationary structure, the attachment to the latter including radial expansion joints. At the turbine end, the mounting includes trunnions supported in spherical bearings, the bearings being carried in axially-extending slides supported from the casing.

According to yet another feature of the invention, the compressor is arranged to discharge into a collector surrounding the circulator, the collector defining with the casing the annular passage for leading gas from the inlet duct to the compressor.

In one form of the invention the compressor includes a number of axial flow stages followed by a final centrifugal stage, while the turbine includes a plurality of axial flow stages. In another form the compressor has a single centrifugal stage and the turbine is of the radial inward flow type.

One embodiment of the invention will now be described by way of example with reference to the accompanying drawings of which:

Figure 1:
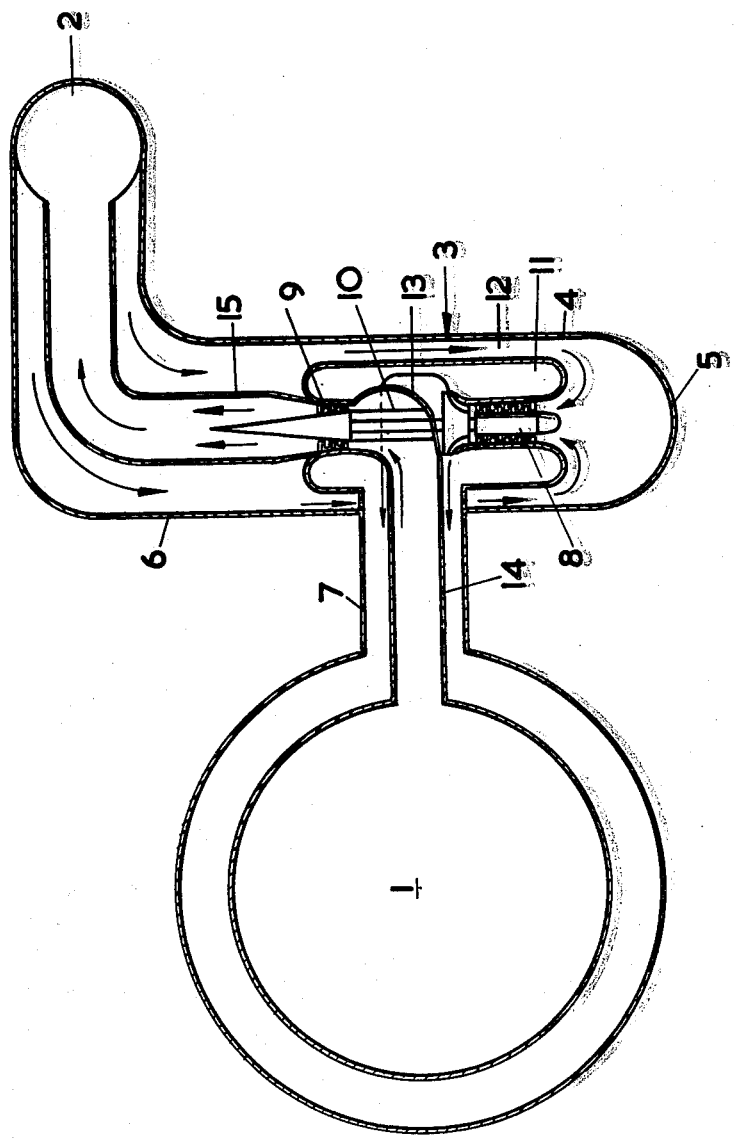
FIGURE 1 is a schematic plan view of the cooling system of a nuclear reactor incorporating a gas turbine-compressor circulator set.

FIGURE 1 shows a gas cooled nuclear reactor 1, a heat exchanger 2 for steam raising in known manner and a gas turbine-compressor circulator set assembly generally indicated at 3. The circulator set assembly comprises a cylindrical pressure casing 4 of circular cross-section closed at one end by a dome 5 and connected at its other end to an inlet duct 6 from the heat exchanger 2. An outlet duct 7 extends through one side of the casing 4 and leads to the reactor 1. Coaxially mounted within the casing is a compressor 8 consisting of a number of axial flow stages and a final centrifugal stage, the inlet end of the compressor being adjacent the closed end of the casing. A multistage axial flow turbine 9 is mounted coaxially with the compressor with its outlet end directed away from the closed end of the casing, and the compressor and turbine rotors are connected by a shaft assembly 10.

The compressor 8 is arranged to discharge into an annular collector 11 surrounding the compressor and turbine, this collector being in communication with the outlet duct 7 whereby gas is supplied to the reactor. The outer wall of the collector defines with the casing an annular passage 12 whereby the compressor inlet is in communication with the inlet duct 6. A turbine inlet volute 13 is mounted between the compressor and turbine and the volute inlet is in communication with an inlet duct 14 coaxially mounted within the outlet duct 7 and connected to lead heated gas from the reactor to the turbine. The turbine outlet is in turn connected to an outlet duct 15 mounted coaxially within the inlet duct 6 whereby gas is led to the heat exchanger.

The direction of gas flow in the system is indicated by the arrows in FIGURE 1. It will be understood that the design of the turbine is such that sufficient work is taken from the gas to drive the compressor but no more, and the useful output of the system is represented by the heat given up for steam raising in the heat exchanger. The gas in the circuit can be any gas having siutable properties of heat transport, suitable thermodynamic properties, and adequate compatibility with materials of construction used in the system.

Figure 2:
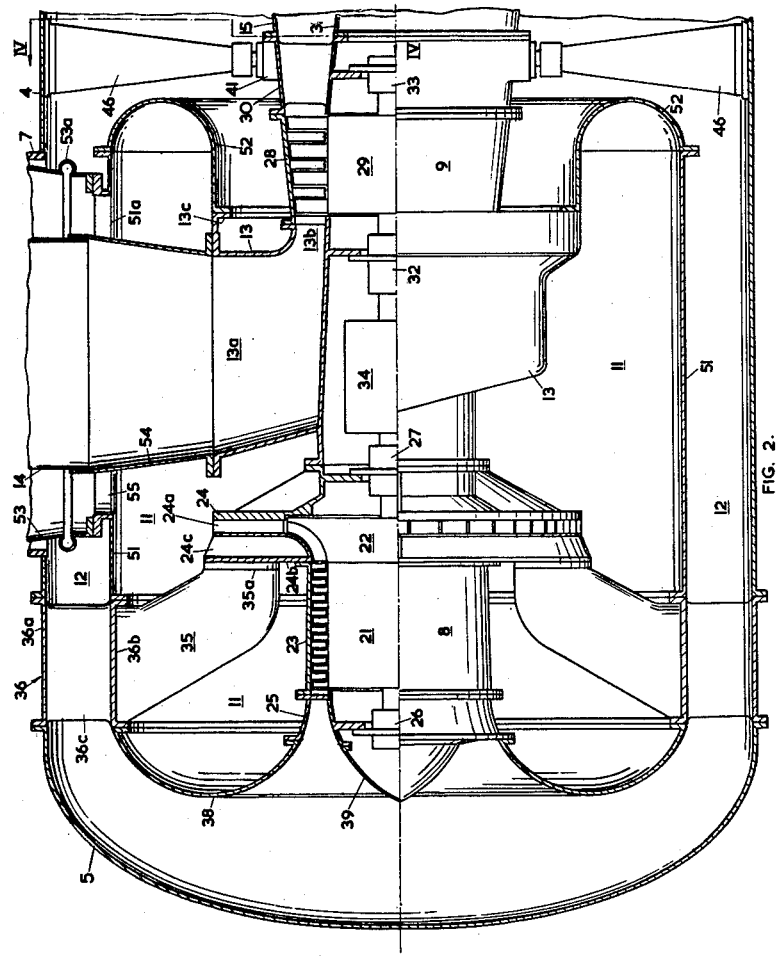
FIGURE 2 is a part sectional view on a horizontal plane of the circulator set assembly.
Figure 3:
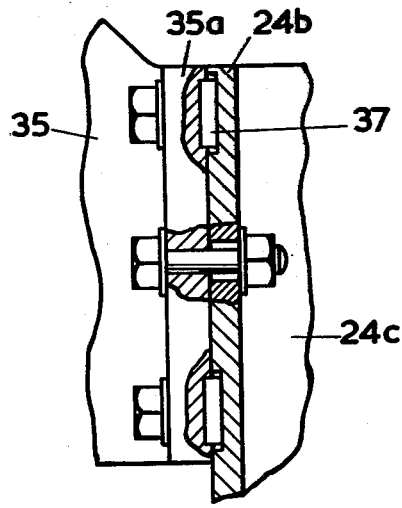
FIGURE 3 is a fragmentary view of a detail of the assembly of FIGURE 2.
Figure 4:
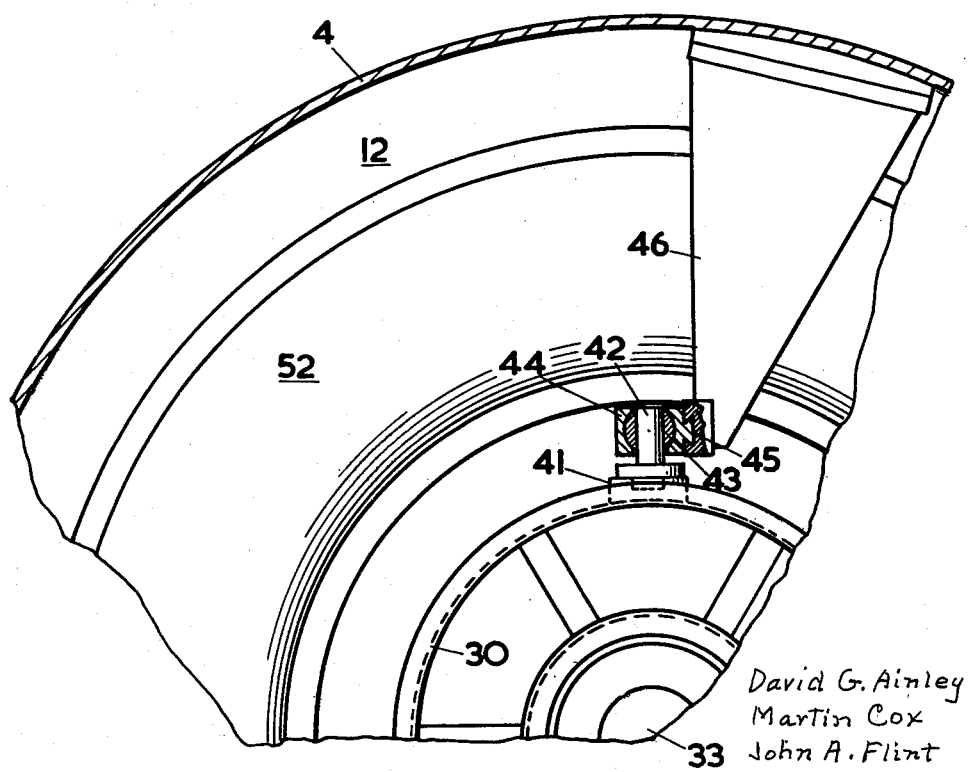
FIGURE 4 is an end view of the assembly taken on the line IV—IV in FIGURE 2.

The construction of the circulator set is shown in greater detail in FIGURES 2, 3 and 4. The compressor 8 comprises a rotor 21 carrying a number of rows of axial flow compressor blades and a centrifugal compressor impeller 22 connected to the rotor 21 to rotate therewith. The rotor 21 is enclosed by a diametrically split stator 23 carrying a number of rows of axial flow stator blades, and this stator is rigidly connected at its downstream end to an outer casing 24 enclosing the impeller, this casing being formed with diffuser vanes 24a in the radially directed compressor outlet. The inlet end of the compressor stator is connected to an annulus 25 comprising inner and outer walls connected by radial struts extending across the gas flow passage, and a bearing assembly 26 for the inlet end of the compressor is supported within this inlet annulus. A bearing assembly 27 for the other end of the compressor is supported within the casing 24.

The end of the casing 24 is connected to the turbine inlet volute 13 which is split on the same plane as the compressor stator 23. The volute has a radially directed inlet 13a and an axially directed outlet 13b, and is connected at its outlet to the diametrically split stator 28 of the turbine 9. The stator carries internally a number of rows of axial flow turbine stator blades and encloses a rotor 29, carrying rows of axial flow turbine rotor blades, and the outlet end of the stator is connected to an outlet annulus 30 comprising inner and outer walls connected by radial struts extending across the gas flow passage. The outer wall of this annulus is connected to the outlet duct 15 while a conventional turbine exhaust fairing 31 is connected to the inner wall. Bearing assemblies 32 and 33 for the upstream and downstream ends of the turbine rotor are supported within the turbine inlet volute 13 and the annulus 30 respectively. The driving connection between the compressor and turbine includes a flexible drive coupling 34.

It will be seen that the gas turbine-compressor circulator set may be regarded as having a rigid backbone structure consisting of the inlet annulus 25, the compressor stator 23 and impeller casing 24, the turbine inlet volute 13, the turbine stator 28 and the outlet annulus 30. The whole set is supported within the casing 4 with freedom for thermal expansion as will now be described.

The support for the compressor end of the circulator is constituted primarily by a number of radially extending strut members 35. The other ends of these struts are integral with an annulus 36 having outer and inner walls 36a, 36b connected by radially extending struts 36c, the outer wall 36a of the annulus being clamped between the casing 4 and the dome 5. The inner ends of the struts 35 are formed with pads 35a which are bolted to a radially extending wall member 24b integral with the casing 24, this wall being supported from the diffuser outlet by webs 24c. As shown in the detail view of FIGURE 3, the abutting faces of wall 24b and pads 35a are fitted with radial keys 37 while the bolt holes are elongated. In this way differential radial expansion of the impeller casing structure 24 and the outer pressure casing 4 is allowed for. The outer wall of the compressor inlet annulus 25 is connected to the inner wall 36b of annulus 36 by an annular fairing 38, and this fairing together with a central fairing 39 attached to the inner wall of the inlet annulus 25 defines the inlet to the compressor.

The support for the turbine end of the circulator is shown in FIGURE 4. The outlet annulus 30 is formed on each side on the horizontal plane with a boss 41 to which is attached to trunnion mounting shaft 42 engaging in a spherical bush 43 carried in a trunnion mounting block 44. The shafts 42 are free to slide in the bushes 43, while each mounting block 44 is carried in an axially extending slide 45 supported from the wall of the pressure casing 4 on the end of a cantilever arm 46. In this way the turbine end of the circulator is free to expand axially and radially, while the spherical bushes allow for distortion of the supports or the turbine stationary structure.

An annular wall 51 encloses the impeller casing 24 and the turbine inlet volute 13 and is connected at its compressor end to the inner wall 36b of the annulus 36. The other end of the wall 51 is connected to a flange 13c on the inlet volute 13 by an annular member 52. It will be seen that the end fairing 38, the inner wall 36b of the annulus 36, the wall 51 and the annular member 52 define the collector 11 into which the compressor discharges. The wall 51 is formed with an outlet opening 51a to which is connected a liner 53 extending into the outlet duct 7 and connected in gas tight manner at its other end to the wall thereof. The liner includes a bellows connection 52a to allow for axial movement of the set relative to the pressure casing 7. A connecting duct 54 is supported within the outlet opening 51a by struts 55 and this duct extends through the collector 11 and connects the inlet 13a of turbine inlet volute to the inlet duct 14. The latter is a loose fit in the connecting duct 54 to allow for thermal expansion.

The outer pressure casing 4 is of circumferentially one-piece construction to enable it to withstand the high internal pressures involved and to minimise gas leakage, while the gas turbine-compressor circulator set can be withdrawn axially. To do this, the end dome 5 is removed and then the bolts or the like connecting the annulus 36 to the pressure casing 4 and to the wall 51 and those connecting the turbine inlet volute 13 to the connecting duct 54 and the annular member 52 are released. The set can then be removed as a unit, after which the upper halves of the compressor and turbine stators and the turbine inlet volute can be removed for inspection of the compressor and turbine blades, the bearings 26, 27, 32, 33 and the coupling 34. Similarly, a replacement set can be inserted as a unit.

The provision of the final centrifugal stage in the compressor enables the gas to be directed radially into the collector 11 in a short axial length, and makes possible a reduction in axial length of the set.

The details of construction of the compressor and turbine rotors, the bearing assemblies and the coupling are not shown as they form no part of the present invention.

In an alternative embodiment the compressor has a single centrifugal stage, while the turbine is of the radial inward flow type.

We claim:

1. A closed cycle gas turbine system comprising a heat source, a heat sink and a gas turbine-compressor circulator set assembly, said assembly comprising, an outer pressure casing of circumferentially one-piece construction and closable at one end;

a dome detachably connected to the pressure casing to close the closable end;

an inlet duct connected to lead gas from the heat sink to the end of the pressure casing remote from the closable end;

an outlet duct extending through the side of the casing and connected to lead gas to the heat source;

a circulator comprising a coaxial compressor and turbine having a driving connection between them and mounted coaxially within the casing with the compressor inlet towards the closable end and the turbine outlet directed towards the other end;

a collector within the casing and surrounding the circulator and defining with the pressure casing an annular passage surounding the circulator for leading gas from said inlet duct to the compressor inlet, said collector having an outlet connected to said outlet duct;

means connecting the compressor outlet to discharge into collector;

a duct mounted coaxially within the outlet duct and connected to lead gas from the heat source to the turbine inlet;

a duct mounted coaxially within the inlet duct and connected to lead gas from the turbine outlet to the heat sink;

an annular member detachably clamped between the pressure casing and said dome;

and radially extending members attached at their inner ends to the compressor stationary structure and at their outer ends to the annular member.

2. A system according to claim 1 wherein the said radially extending members are attached to a radial face on the compressor stationary structure, the attachment to said face including radial expansion joints.

3. A system according to claim 1 wherein the turbine end of the circulator is supported from the pressure casing by trunnion shafts extending radially from the turbine stationary structure, spherical bushes supporting the trunnion shafts, axially extending slides carrying the spherical bushes and means supporting the slides from the casing.

4. In combination, a gas-cooled nuclear reactor, a heat exchanger and a closed gas-circulating system including a gas turbine-compressor circulator set assembly, said assembly comprising, an outer pressure casing of circumferentially one-piece construction and closable at one end;

a dome detachably connected to the pressure casing to close the closable end;

an inlet duct connected to lead gas from the heat exchanger to the end of the pressure casing remote from the closable end;

an outlet duct extending through the side of the casing and connected to lead gas to the nuclear reactor;

a circulator comprising a coaxial compressor and turbine having a driving connection between them and mounted coaxially within the casing with the compressor inlet towards the closable end and the turbine outlet directed towards the other end;

means defining with the inner surface of the pressure casing an annular passage surrounding the circulator for leading gas from said inlet duct to the compressor inlet;

means connecting the compressor outlet to discharge into the outlet duct;

a duct mounted coaxially within the outlet duct and connected to lead gas from the nuclear reactor to the turbine inlet;

a duct mounted coaxially within the inlet duct and connected to lead gas from the turbine to the heat exchanger;

an annular member detachably clamped between the pressure casing and said dome;

and radially extending members attached at their inner ends to the compressor stationary structure and at their outer ends to the annular member.

References Cited by the Examiner

UNITED STATES PATENTS

| | | | |
|---|---|---|---|
| 2,268,074 | 12/41 | Keller | 60—59 |
| 2,882,687 | 4/59 | Stivender | 60—59 |
| 2,975,118 | 3/61 | Tognoni | 176—59 |

FOREIGN PATENTS

| | | |
|---|---|---|
| 226,105 | 12/59 | Australia. |
| 578,992 | 7/59 | Canada. |
| 737,648 | 9/55 | Great Britain. |

CARL D. QUARFORTH, *Primary Examiner.*

REUBEN EPSTEIN, *Examiner.*